March 8, 1955  E. COOKE  2,703,553
BIRD HARNESS
Filed Dec. 28, 1953
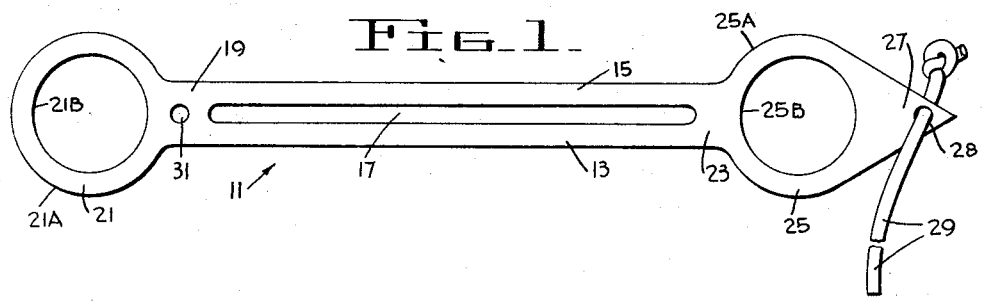
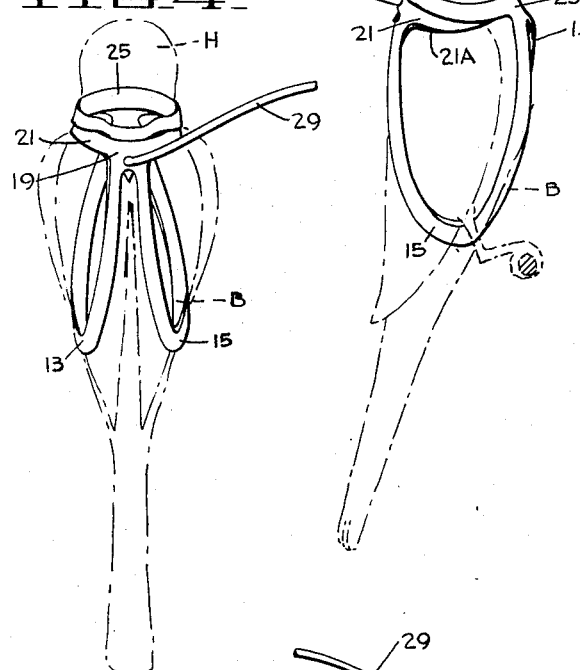
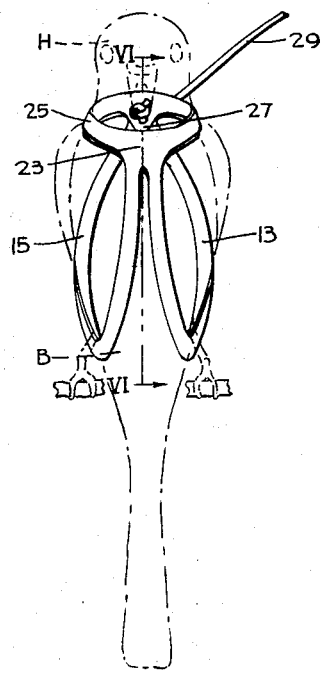
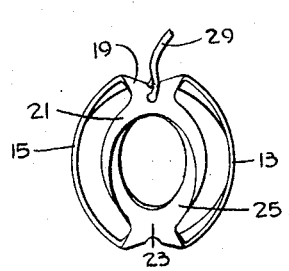
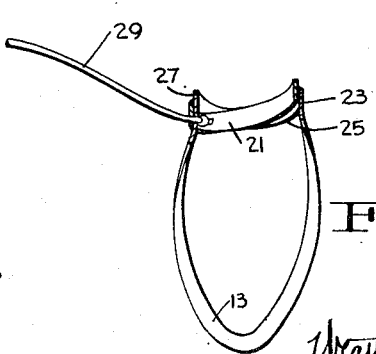
INVENTOR
EVELYN COOKE
BY Weatherford and Weatherford
attys

United States Patent Office 2,703,553
Patented Mar. 8, 1955

2,703,553

BIRD HARNESS

Evelyn Cooke, Memphis, Tenn.

Application December 28, 1953, Serial No. 400,626

5 Claims. (Cl. 119—97)

This invention relates to certain new and useful improvements in harness devices, particularly adapted for use in connection with birds such as parakeets, canaries, and the like, to permit the uncaging of such birds while limiting the danger of escape of same.

The principal object of the invention is to provide a new and novel harness device for birds.

A further object of the invention is to provide such a harness device which may simply and readily be placed upon or removed from a bird, which will permit a maximum freedom of physical action on the part of the harnessed bird, and which will tend to substantially eliminate any danger of harm to the bird as by strangulation or the like.

A further object of the invention is to provide a neck and leg root engaging harness adapted for use with small birds.

A further object of the invention is to generally improve the design, construction and efficiency of harness devices to adapt same for use with birds.

The means by which the foregoing and other objects of the present invention are accomplished and the manner of their accomplishment will be readily understood from the following specification upon reference to the accompanying drawings, in which:

Fig. 1 is a face view of the harness device in extended non-use position.

Fig. 2 is a side elevational view of the harness illustrating its mounting as upon a bird.

Fig. 3 is a front view of the harness in use position.

Fig. 4 is a rear view of the harness in use position.

Fig. 5 is a top view of the harness; and

Fig. 6 is a sectional view of the harness taken as on the line VI—VI of Fig. 3.

Referring now to the drawings in which the various parts are indicated by numerals, the harness 11 is an integral device formed of flat, flexible material preferably as of leather or the like, and includes a main body portion having a pair of elongated parallel strips 13, 15 separated by a longitudinal slot 17. At one end the strips 13, 15 merge into a connector portion 19 which closes the adjacent end of slot 17 and serves to connect the strips 13, 15 to a ring-like collar 21. At their opposite ends the strips 13, 15 merge into a second connector portion 23 which serves to connect the strips to a second collar portion 25. The open interiors of the collar portions 21, 25 are preferably substantially circular and are of substantially equal diameter, adapted to pass over the head of a bird and to snugly engage against the neck of the bird. One of the collar portions, as the collar portion 25, remote from its connector 23, is provided with a substantially triangular tab 27 which is apertured as at 28 adjacent the apex of the triangle to slidably receive a suitable line or leash 29, at least one end of which is provided with means for preventing escape of the leash from the aperture. Additionally, connector portion 19 is apertured as at 31 intermediate collar 21 and strips 13, 15, the aperture 31 being dimensioned and adapted to slidably receive an end of leash 29 when the same is inserted therein as hereinafter described.

In the use of the device it is folded from the extended position shown in Fig. 1 to a folded use position as shown in the remaining figures of the drawings, in which the first collar portion 21 is passed over the head H of a bird B and is positioned with the outer rim 21A of collar 21 lowermost and the inner rim 21B of the open interior of collar 21 uppermost. Connector portion 19 and its aperture 31 is positioned below the back of the bird head H, preferably adjacent the base of the neck of the bird B. The body portion of the harness is folded along the back of the bird with the slot 17 being opened and as opened passed over the tail of the bird with the strips 13, 15 being separated and respectively passing beneath the wings of the bird, then being brought forwardly between the legs of the bird and upwardly along the breast of the bird toward the head of the bird until collar 25, adjacent to connector portion 23, lies forward of and against the forward portion of positioned collar 21. Collar 25 is then passed over the bird head H with the outer rim 25A lowermost and the inner rim 25B uppermost, embracing the forward portion of collar 21 and overlying the rear portion of collar 21, with the triangular tab 27 extending downwardly along the neck of bird B and the apex of the tab preferably lying within the collar 21 and positioned with aperture 28 in register with aperture 31, the free end of leash 29 being passed through aperture 31 insuring fastening of the harness in use position, and the arrangement effectively blocking independent relative movement of the collars 21, 25 which might effect strangulation of the harnessed bird. It will be seen that collar 25 surrounds and embraces the forward portion of collar 21 and overlies the rearward portion of collar 21 with the tab portion of collar 25 lying within collar 21, and that strips 13, 15 depend as open loops from the collars for engaging beneath the wings of the bird B and between the legs of the bird adjacent the roots of the legs.

With the device thus positioned it will be seen that the bird is free to manipulate its wings and head, yet is restrained by the harness from escape. When it is desired to remove the harness from the bird, leash 29 is withdrawn from aperture 31, collar 25 removed from the bird's head, the body of the harness moved from between the legs and beneath the wings of the bird, and collar 21 withdrawn, thus permitting return of the bird to its cage in unharnessed condition.

It will be seen that as the collars 21, 25 are of substantially equal diameter the insertion of the bird head therethrough is equally facilitated, and that by the positioning of the collars with the smaller inner rims 21B, 25B uppermost a flaring collar of flat strip-like material is provided, avoiding any edges that might tend to bite into the neck of the bird. Additionally, the provision of the tab 27 provides for ease of positioning the device within the first collar 21, and likewise provides a pad bearing against the back of the bird and engaging with the inward portion of positioned collar 21 assisting in preventing relative movement between the collars.

I claim:

1. A harness device as for birds and the like, comprising a body portion having a pair of elongated strips separated by a slot, a pair of substantially circular ring-like collars respectively connected to the opposite ends of said body portion, said collars having open centers of substantially the same diameter respectively adapted to pass over the head of a bird, one of said collars, remote from said body portion, having a substantially triangular tab fixed thereto, said tab being apertured adjacent its apex and offset from said one collar, a leash slidably disposed in the aperture in said tab, said body portion having a leash receiving aperture formed between the other said collar and said strips, said harness device being made of flexible material and being foldable into use position; said harness device in said use position being disposed with said one collar embracing the forward portion of the other said collar and overlying the rearward portion of the other said collar, said strips depending from said collars as open, spaced loops, said tab lying within said other collar with said tab aperture in register with said body portion aperture and said leash extending through said registered apertures to detachably fasten said harness in said position, said collars and said loops being respectively positionable around the neck and beneath the opposite wings of a bird to be harnessed.

2. A harness device as for birds and the like, comprising a body portion having a pair of elongated strips, a pair of ring-like collars respectively connected to the opposite ends of said body portion, said collars having open centers of substantially the same size respectively adapted to pass over the head of a bird, one of said collars, remote from said body portion, having an offset tab fixed thereto, said tab being apertured offset from said one collar, a leash slidably disposed in the aperture in said tab, said body portion having a leash receiving aperture formed between the other said collar and said strips, said harness device being made of flexible material and being foldable into use position, said harness device in said use position being disposed with said one collar embracing the forward portion of the other said collar and overlying the rearward portion of the other said collar, said tab lying within said other collar with said tab aperture in register with said body portion aperture and said leash extending through said registered apertures to detachably fasten said harness in said position.

3. A harness device as for birds and the like, comprising a body portion having a pair of elongated strips, a pair of ring-like collars respectively connected to the opposite ends of said body portion, said collars having open centers of substantially the same size respectively adapted to pass over the head of a bird, one of said collars, remote from said body portion, having a tab fixed thereto, said tab being apertured adjacent its apex and offset from said one collar, a leash slidably disposed in the aperture in said tab, said harness device being made of flexible material and being foldable into use position, said harness device in said use position being disposed with said one collar embracing the forward portion of the other said collar and overlying the rearward portion of the other said collar, said tab lying against a part of said body portion, said leash extending through said aperture and said body portion to detachably fasten said harness in said position.

4. A flexible harness device as for birds and the like, comprising in use position a body portion having a pair of elongated strips defining open loops, separated by a slot, a pair of collars respectively connected to the opposite ends of said body portion, said open loops depending from said collars in spaced relation, said collars having open centers respectively adapted to pass over the head of a bird, one of said collars, remote from its connection to said body portion, having a projecting tab fixed thereto, said tab being apertured offset from said one collar, a leash slidably disposed in the aperture in said tab, said body portion having a leash receiving aperture formed between the other said collar and said strips, said one collar embracing the forward portion of the other said collar and overlying the rearward portion of the other said collar, said tab lying within said other collar with said tab aperture in register with said body portion aperture and said leash extending through said registered apertures to detachably fasten said harness in said position.

5. A flexible harness device as for birds and the like, comprising in use position a body portion having a pair of elongated strips defining open loops, a pair of collars respectively connected to the opposite ends of said body portion, said open loops depending from said collars in spaced relation, said collars having open centers respectively adapted to pass over the head of a bird, a leash slidably connected to one of said collars, and extending through said body portion to detachably fasten said harness in said position, said one collar embracing the forward portion of the other said collar and overlying the rearward portion of the other said collar.

References Cited in the file of this patent

UNITED STATES PATENTS

| | | |
|---|---|---|
| 1,066,821 | Kurrelmeyer | July 8, 1913 |
| 1,962,188 | Freeman | June 12, 1934 |
| 2,233,397 | Bloom | Mar. 4, 1941 |
| 2,670,712 | Patience et al. | Mar. 2, 1954 |